(No Model.)
T. F. GEARY & W. E. BRACEWELL.
NUMBERING MACHINE.
No. 546,382. Patented Sept. 17, 1895.
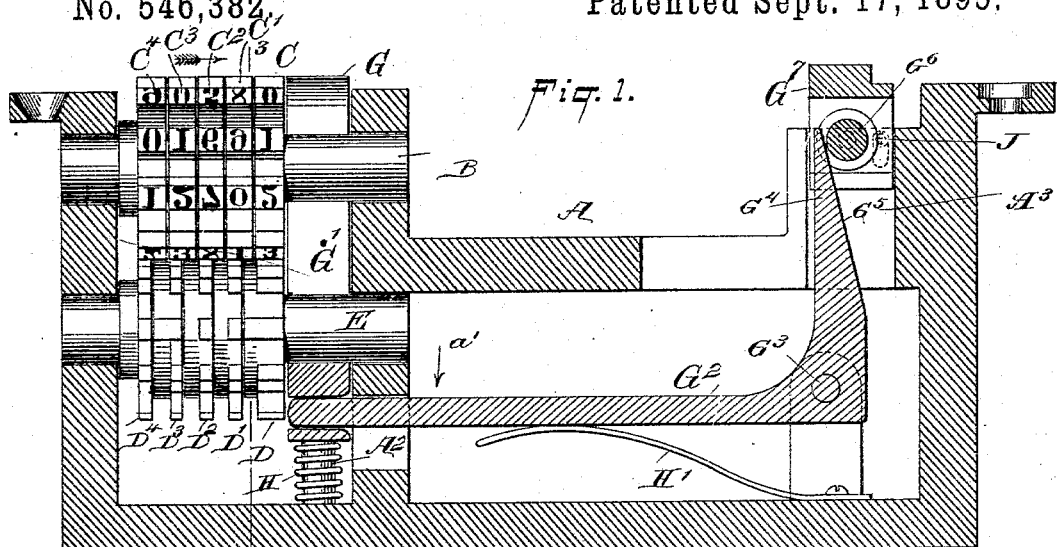
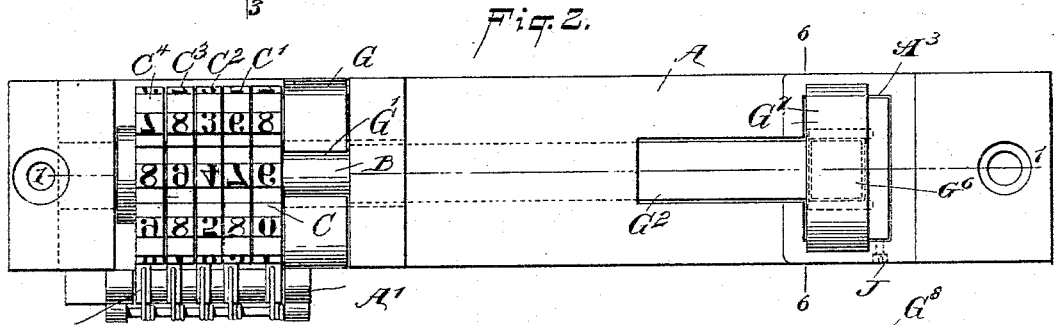
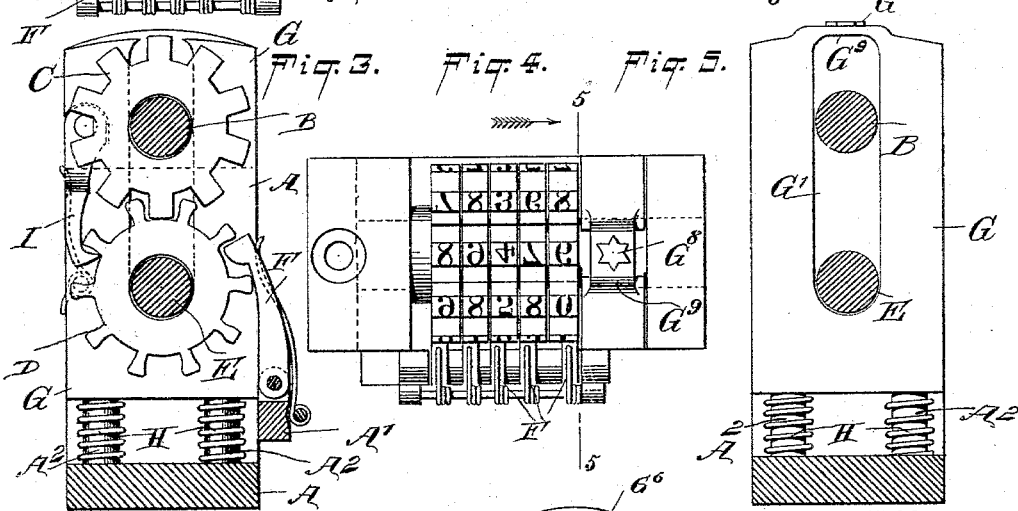
WITNESSES:
William Goebel.
Theo. G. Hoster
INVENTORS
T. F. Geary
W. E. Bracewell
BY Munn & Co.
ATTORNEYS.

UNITED STATES PATENT OFFICE.

THOMAS F. GEARY AND WILLIAM E. BRACEWELL, OF BROOKLYN, ASSIGNORS TO THE NEW YORK STENCIL WORKS, OF NEW YORK, N. Y.

NUMBERING-MACHINE.

SPECIFICATION forming part of Letters Patent No. 546,382, dated September 17, 1895.

Application filed June 13, 1894. Serial No. 514,423. (No model.)

*To all whom it may concern:*

Be it known that we, THOMAS F. GEARY and WILLIAM E. BRACEWELL, of Brooklyn, in the county of Kings and State of New York, have invented a new and Improved Numbering-Machine, of which the following is a full, clear, and exact description.

The object of the invention is to provide a new and improved numbering-machine which is comparatively simple and durable in construction, more especially designed for use in rotary web-perfecting printing-presses and other machines, and arranged for insertion in the type or printing-plate cylinder, so as to be inked by the usual type-inking roller, and on each revolution the numbering-machine is actuated on coming in contact with the impression-cylinder.

The invention consists of certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1 is a sectional side elevation of the improvement. Fig. 2 is a plan view of the same. Fig. 3 is a transverse section of the same on the line 3 3 of Fig. 1. Fig. 4 is a plan view of a modified form of the improvement. Fig. 5 is a transverse section of the same on the line 5 5 of Fig. 4, and Fig. 6 is a transverse section of part of the improvement on the line 6 6 of Fig. 2.

The improved numbering-machine is provided with a suitably-constructed frame A, adapted to be inserted in the type or plate cylinder of a rotary web-perfecting printing-press or other machine, so that on each revolution of the type or plate cylinder the said frame passes the impression-cylinder to change the consecutive numbering, as hereinafter more fully described.

In the frame A is arranged a shaft B, extending longitudinally and carrying a series or set of numbering-wheels C, C', C², C³, and C⁴ in mesh with a corresponding set of gear-wheels D D' D² D³ D⁴, mounted to rotate loosely on a shaft E, likewise held in the frame A directly below the shaft B, as plainly illustrated in Figs. 1, 3, and 5. Each gear-wheel in the set of gear-wheels D D' D² D³ D⁴ has one of its teeth widened transversely, so as to mesh into the adjacent numbering-wheel beside meshing with its own numbering-wheel, so that when this widened tooth is in mesh with its own numbering-wheel it also meshes the adjacent numbering-wheel and hence turns both simultaneously—that is to say, when the gear-wheel D for the units numbering-wheel C meshes with its widened tooth the said units-wheel C it also meshes the tenth numbering-wheel C', and on further rotation of the said gear-wheel D both numbering-wheels C and C' are shifted, and likewise the gear-wheel D'. By this arrangement on each revolution of a gear-wheel D the adjacent numbering-wheel is shifted and the corresponding gear-wheel of the latter, so that a shifting of the numbering-wheels is obtained for consecutive numbering. A detent F, pivoted on a bar A' of the main frame, engages each gear-wheel D, D', D², D³, and D⁴ to prevent accidental return movement of the latter.

On the shafts B and E is guided a slide G, having a vertically-disposed slot G', through which extend the shafts B and E, as plainly shown in Figs. 3 and 5. The lower end of the slide G is pressed on by springs H, coiled on pins A², forming part of the main frame A, the said pins also forming guiding-posts for the slide G.

On the slide G is pivoted a spring-pressed pawl I, engaging the teeth of the gear-wheel D for the units numbering-wheel C, the said pawl being so arranged that on the downward sliding of the guide it glides over the corresponding tooth of the gear-wheel D, and on the upward movement of the said slide the pawl I turns the gear-wheel D the distance between two teeth. The lower end of the slide G is engaged by the horizontal member of a bell-crank lever G², fulcrumed at G³ on the frame A and having its vertical member G⁴ formed at the outside with an incline or bevel G⁵, engaged by a grooved friction-roller G⁶, journaled in a head G⁷, fitted to slide vertically in bearings A³, formed on the frame A. The top of this sliding head G⁷ is rounded off transversely, as plainly shown in Fig. 6, and is adapted to move in contact with the impression-cylinder or other part of the machine on each revolution of the type or plate cylinder, carrying the frame A. By this arrangement the head $G^7$ is pressed inward and the friction-roller $G^6$ travels on the incline $G^5$ of the member $G^4$ to impart a swinging motion to the bell-crank lever $G^2$ in the direction of the arrow $a'$, so that the slide G is moved inward against the tension of the springs H. Now, as soon as the projection $G^7$ has passed the impression-cylinder on the further rotation of the type or plate cylinder, then the springs H return the slide G to its normal or outermost position, whereby the pawl I turns the wheel D, as above described. The outward movement of the slide G causes a return movement of the bell-crank lever $G^2$ and the head $G^7$ by the incline $G^5$, pressing the friction-roller outward to return the head $G^7$ to its normal position. A stop-pin J or other suitable device limits the movements of the sliding head $G^7$. (See dotted lines in Figs. 1 and 2.) A spring H' under the horizontal member of the bell-crank lever assists the return movement of the said lever and head.

As illustrated in Fig. 4, the bell-crank lever $G^2$ is dispensed with and the head $G^7$ is substituted by an integral head $G^8$, in the form of a star or other character and secured or formed on a bridge $G^9$, held on top of the slide G over the slot G', as indicated in Figs. 4 and 5. Now, when this head $G^8$ comes in contact with the impression-cylinder, the slide G is pressed downward or inward, and returned to its normal position after leaving the impression-cylinder by the springs H. The inward and outward sliding of the slide G causes the pawl I to turn the wheel D, as previously described.

It is understood that the heads $G^7$ and $G^8$ extend above the type-surface of the numeral-wheels C, C', $C^2$, $C^3$, and $C^4$ and that of the type or plate in the type or plate cylinder, so that when the heads come in contact with a friction-roller or other part in the impression-cylinder, then the slide is actuated, as above described.

Having thus fully described our invention, we claim as new and desire to secure by Letters Patent—

1. A numbering machine, comprising a frame adapted to be set in a type or printing plate cylinder, a series of numbering wheels mounted in the frame, gear wheels also mounted in the frame below the numbering wheels and meshing therewith, each gear wheel having a tooth for engaging the adjacent numbering wheel, a spring pressed slide provided with a slot through which the shafts of the numbering and gear wheels pass, a pawl carried by the slide and engaging one of the gear wheels, and a head adapted to be engaged by the impression cylinder to operate the slide, substantially as described.

2. A numbering machine, comprising a frame adapted to be set in a type or printing plate cylinder, a series of numbering wheels mounted in the frame, gear wheels also mounted in the frame below the numbering wheels and meshing therewith, each gear wheel having a tooth for engaging the adjacent numbering wheel, a slide provided with a slot through which the shafts of the numbering and gear wheels pass and with a head on its upper end adapted to be engaged by the impression cylinder, springs arranged between the lower end of the slide and the frame, and a pawl carried by the slide and engaging one of the gear wheels, substantially as described.

3. A numbering machine, comprising a frame adapted to be set in a type or printing plate cylinder, two shafts mounted in the frame one above the other, a series of numbering wheels loose on the upper shaft, gear wheels loose on the lower shaft and meshing with the numbering wheels, each gear wheel having a tooth for engaging the adjacent numbering wheel, a slide provided with a longitudinal slot through which the shaft of the numbering and gear wheels pass and with a head on its upper end adapted to be engaged by the impression cylinder, pins on the frame below the slide, springs surrounding the pins and engaging the frame and slide, a pawl carried by the slide and engaging one of the gear wheels, and dogs carried by the frame and engaging the gear wheels to prevent return movement thereof, substantially as herein shown and described.

THOMAS F. GEARY.
WILLIAM E. BRACEWELL.

Witnesses:
P. VAN ALSTYNE,
WM. STANDERWICK.